(12) United States Patent
Odillard et al.

(10) Patent No.: US 9,903,660 B2
(45) Date of Patent: Feb. 27, 2018

(54) HEAT EXCHANGER, IN PARTICULAR FOR A MOTOR VEHICLE, AND CORRESPONDING AIR INTAKE DEVICE

(75) Inventors: Laurent Odillard, Le Luart (FR); Sebastien Devedeux, Versailles (FR)

(73) Assignee: VALEO SYSTEMS THERMIQUES, Le Mesnil Saint Denis (FR)

( * ) Notice: Subject to any disclaimer, the term of this patent is extended or adjusted under 35 U.S.C. 154(b) by 736 days.

(21) Appl. No.: 14/122,510

(22) PCT Filed: Feb. 13, 2012

(86) PCT No.: PCT/EP2012/052388
§ 371 (c)(1),
(2), (4) Date: Feb. 3, 2014

(87) PCT Pub. No.: WO2012/159777
PCT Pub. Date: Nov. 29, 2012

(65) Prior Publication Data
US 2014/0166253 A1     Jun. 19, 2014

(30) Foreign Application Priority Data
May 26, 2011   (FR) ...................... 11 54577

(51) Int. Cl.
*F28F 3/08*     (2006.01)
*F28D 7/02*     (2006.01)
(Continued)

(52) U.S. Cl.
CPC ............ *F28D 7/02* (2013.01); *F02B 29/0462* (2013.01); *F28D 9/0043* (2013.01); *F28D 2021/0082* (2013.01); *Y02T 10/146* (2013.01)

(58) Field of Classification Search
CPC .......... F28D 7/20; F28D 9/0043; F28D 9/005; F28D 9/0056; F28D 2021/0082;
(Continued)

(56) References Cited

U.S. PATENT DOCUMENTS 2,843,367 A * 7/1958 Bogus ................. F02B 29/0462
165/139
4,474,162 A  10/1984 Mason
(Continued)

FOREIGN PATENT DOCUMENTS

DE  102005050738 A1   4/2007
DE  102009025282 A1  12/2010
(Continued)

OTHER PUBLICATIONS

English language abstract and machine assisted translation for DE 102005050738 extracted from espacenet.com database on May 5, 2014, 12 pages.
(Continued)

*Primary Examiner* — Claire Rojohn, III
(74) *Attorney, Agent, or Firm* — Howard & Howard Attorneys PLLC

(57) ABSTRACT

A heat exchanger for heat exchange between at least two fluids, in particular for a motor vehicle, includes: a core (3) for heat exchange between the fluids, and a casing (5) for receiving the core and having at least one side opening. The exchanger further includes a cover (7) for closing the at least one opening in the casing (5), which is tightly connected to the core (3) and the casing (5) in order to form a non-separable unit assembly.

16 Claims, 1 Drawing Sheet

(51) Int. Cl.
*F02B 29/04* (2006.01)
*F28D 9/00* (2006.01)
*F28D 21/00* (2006.01)

(58) Field of Classification Search
CPC .. F28D 9/0062; F28D 9/0075; F02B 29/0462; Y02T 10/146
USPC ........................................ 165/152, 153, 176
See application file for complete search history.

(56) References Cited

U.S. PATENT DOCUMENTS

| | | | | |
|---|---|---|---|---|
| 6,283,199 | B1* | 9/2001 | Nakamura | F28D 9/0043 165/167 |
| 7,571,718 | B2* | 8/2009 | Hendrix | F28D 7/1684 123/563 |
| 7,661,415 | B2* | 2/2010 | Nakamura | F28D 9/0025 123/568.12 |
| 8,651,092 | B2* | 2/2014 | Ghiani | F02B 29/0462 123/542 |
| 8,695,574 | B2* | 4/2014 | Nguyen | F02B 29/0475 123/540 |
| 8,708,036 | B2* | 4/2014 | Ikeda | F02B 29/0462 165/157 |
| 8,720,199 | B2* | 5/2014 | Gaensler | F28D 7/1653 165/157 |
| 8,857,415 | B2* | 10/2014 | Bauer | F02B 29/0462 123/542 |
| 2002/0104645 | A1* | 8/2002 | Yoshida | F28D 9/0043 165/166 |
| 2003/0000688 | A1* | 1/2003 | Mathur | F28D 9/0006 165/167 |
| 2003/0116305 | A1* | 6/2003 | Beddome | F28D 9/0043 165/81 |
| 2003/0173068 | A1* | 9/2003 | Davies | F02M 31/20 165/170 |
| 2004/0069475 | A1* | 4/2004 | Brost | F28D 9/0043 165/173 |
| 2005/0056411 | A1* | 3/2005 | Dilley | F28D 9/0018 165/167 |
| 2006/0278377 | A1* | 12/2006 | Martins | F02B 29/0412 165/140 |
| 2007/0131401 | A1 | 6/2007 | Daly et al. | |
| 2007/0175617 | A1* | 8/2007 | Brost | F02B 29/0462 165/149 |
| 2007/0181105 | A1 | 8/2007 | Bazika | |
| 2007/0193732 | A1* | 8/2007 | Oofune | F28D 7/1684 165/164 |
| 2008/0041570 | A1* | 2/2008 | Abels | F28D 1/0316 165/148 |
| 2008/0053644 | A1 | 3/2008 | Beetz et al. | |
| 2008/0156472 | A1* | 7/2008 | Maucher | B23K 1/0012 165/166 |
| 2008/0289804 | A1 | 11/2008 | Baumann et al. | |
| 2009/0014151 | A1* | 1/2009 | Capelle | F28D 7/06 165/44 |
| 2009/0056922 | A1* | 3/2009 | Hemminger | F28F 9/02 165/158 |
| 2009/0194265 | A1* | 8/2009 | Nakamura | F28D 9/0025 165/149 |
| 2010/0071871 | A1* | 3/2010 | Gaensler | F28D 7/1653 165/51 |
| 2010/0096101 | A1 | 4/2010 | Braun et al. | |
| 2010/0096103 | A1 | 4/2010 | Toda et al. | |
| 2011/0168366 | A1 | 7/2011 | Garret et al. | |
| 2011/0168370 | A1* | 7/2011 | Garret | F28D 7/1684 165/158 |
| 2012/0210986 | A1* | 8/2012 | Ghiani | F02B 29/0462 123/542 |
| 2013/0075056 | A1* | 3/2013 | Fernandez | H04Q 1/025 165/45 |
| 2014/0000569 | A1* | 1/2014 | Eilemann | F02B 29/0462 123/542 |
| 2014/0041832 | A1* | 2/2014 | Grande Fernandez | F28D 7/1684 165/69 |
| 2014/0130764 | A1* | 5/2014 | Saumweber | F02B 29/045 123/184.21 |
| 2014/0138807 | A1 | 6/2014 | Odillard et al. | |
| 2014/0318120 | A1 | 10/2014 | Svihla et al. | |
| 2015/0068501 | A1* | 3/2015 | Ferlay | F28F 9/001 123/542 |
| 2015/0316330 | A1* | 11/2015 | Kenney | F28D 9/0043 165/167 |
| 2015/0338167 | A1 | 11/2015 | Pomin et al. | |
| 2016/0097596 | A1* | 4/2016 | Stewart | F28D 1/0233 165/175 |

FOREIGN PATENT DOCUMENTS

| | | | |
|---|---|---|---|
| EP | 0285504 A1 | 10/1988 | |
| EP | 0406774 A1 | 1/1991 | |
| EP | 0578916 A2 | 1/1994 | |
| EP | 1785609 A1 | 5/2007 | |
| EP | 2014892 A1 | 1/2009 | |
| FR | 2645209 A1 | 10/1990 | |
| FR | 2855605 A1 | 12/2004 | |
| JP | 0752637 A | 2/1995 | |
| WO | WO 2009156365 A1 | 12/2009 | |
| WO | WO 2011023516 A1 * | 3/2011 | .......... F02B 29/0462 |

OTHER PUBLICATIONS

English language abstract and machine assisted translation for DE 102009025282 extracted from espacenet.com database on May 5, 2014, 20 pages.

English language abstract and machine assisted translation for EP 0285504 extracted from espacenet.com database on May 5, 2014, 18 pages.

English language abstract and machine assisted translation for EP 0578916 extracted from espacenet.com database on May 5, 2014, 21 pages.

English language abstract for EP 1785609 extracted from espacenet.com database on May 5, 2014, 2 pages.

English language abstract and machine assisted translation for FR 2645209 extracted from espacenet.com database on May 5, 2014, 11 pages.

English language abstract and machine assisted translation for FR 2855605 extracted from espacenet.com database on May 5, 2014, 11 pages.

English language abstract and machine assisted translation for JP 0752637 extracted from espacenet.com database on May 5, 2014, 11 pages.

English language abstract for WO 2009156365 extracted from espacenet.com database on May 5, 2014, 2 pages.

International Search Report for PCT/EP2012/052388, dated Mar. 19, 2012, 7 pages.

International Search Report for PCT/EP2012/002160, dated Oct. 29, 2012, 7 pages.

* cited by examiner

HEAT EXCHANGER, IN PARTICULAR FOR A MOTOR VEHICLE, AND CORRESPONDING AIR INTAKE DEVICE

RELATED APPLICATIONS

This application is the National Stage of International Patent Application No. PCT/EP2012/052388, filed on Feb. 13, 2012, which claims priority to and all the advantages of French Patent Application No. FR 11/54577, filed on May 26, 2011, the content of which is incorporated herein by reference.

The invention relates to a heat exchanger, notably for a motor vehicle. The invention also relates to an air intake device comprising such an exchanger.

BACKGROUND

A heat exchanger, for example used in the automobile industry, comprises fluid heat exchange and flow elements in which fluids mutually exchanging heat circulate. The heat exchange elements can, for example, comprise tubes or plates, fins for disrupting the circulation of gas and/or disturbing fluid flow disrupting elements, or similar.

Such exchangers used in the automobile domain are known, notably in the field of supercharged heat engines.

In this case, the heat exchanger, also called supercharging air cooler (abbreviated RAS), makes it possible to cool the supercharging air of an engine by heat exchange with another fluid such as the outside air or a liquid such as the water from the engine coolant circuit, thus forming an air/air or liquid/air type exchanger.

Traditionally, the air is received at what those skilled in the art often refer to as "intake manifold".

The manifold is fastened to the cylinder head of the combustion chamber, that is to say the cylinder inlet. Depending on the engine speed, the air may be cooled, wholly or partly, or not cooled.

According to one known solution, the heat exchanger RAS is received in the manifold and makes it possible to cool the air which passes through it.

To this end, the manifold has an open face allowing for the introduction of the exchanger RAS within it. This opening is subsequently closed by a closing cover.

It is therefore necessary to provide an additional assembly step. This can have an impact on the cost.

Furthermore, this implementation can present sealing drawbacks, which can result in poor heat exchange performance levels and in particular generate vibration phenomena. In effect, the sealing between the outside medium and the device, the sealing between the closing cover and the bundle, and the sealing between the bundle and the manifold all have to be controlled.

Furthermore, the connection between the bundle and the lateral closing cover can require the addition of fastening parts such as screws or clips.

It may also be necessary to add joints at the water connections.

SUMMARY OF THE INVENTION

The aim of the invention is to propose a heat exchanger exhibiting enhanced sealing and making it possible to optimize the performance levels of the exchanger, while simplifying the assembly.

To this end, the subject of the invention is a heat exchanger between at least two fluids, notably for a motor vehicle, comprising:
a heat exchange bundle between said fluids, and
a housing for receiving said bundle, having at least one lateral opening,
characterized in that said exchanger also comprises a cover for closing said at least one opening of said housing, securely attached in a seal-tight manner to said bundle and to said housing so as to form an inseparable unitary assembly.

Said exchanger can also comprise one or more of the following features, taken separately or in combination:
said housing has a substantially generally "U" shape, and said cover has a substantially generally "U" shape complementing the shape of said housing;
said housing is securely attached by brazing;
said cover has a peripheral edge forming a protrusion relative to said bundle and to said housing;
said peripheral edge comprises fixing means for fixing to a container of said exchanger;
said exchanger comprises sealing means at said peripheral edge of said cover;
said housing is inserted between said bundle and said cover;
said exchanger comprises at least one fluid inlet pipe and one fluid outlet pipe, and said cover has associated orifices for the passage of said fluid;
said pipes are brazed onto said cover;
said housing has associated orifices for the circulation of said fluid between said bundle and said pipes;
said exchanger is configured to cool the supercharging air of an engine in a motor vehicle.

The invention also relates to an air intake device, notably for a motor vehicle, characterized in that it comprises a heat exchanger as defined above as well as an intake manifold receiving said exchanger.

According to one embodiment, said device comprises sealing means between said closing cover of said exchanger and said manifold.

BRIEF DESCRIPTION OF THE DRAWINGS

Other features and advantages of the invention will become more clearly apparent on reading the following description, given as an illustrative and nonlimiting example, and the appended drawings in which.

DETAILED DESCRIPTION

In these figures, the elements that are substantially identical bear the same references.

The invention relates to a heat exchanger, in particular for cooling the supercharging air for a heat engine of a motor vehicle.

In this case, the exchanger can be arranged in an air intake manifold (not represented). Such a manifold (not illustrated in the figures), otherwise called feed gas distributor, is generally mounted on the cylinder head and allows for the intake of the supercharging air into the cylinder head.

The assembly formed by the air intake manifold and the exchanger received in the manifold forms a supercharging air intake device.

Such an exchanger can be a so-called "air-water" exchanger, that is to say an exchanger in which the fluids which exchange heat are air and water. In the case of a supercharging air cooler, the water is preferably water from the so-called "low temperature" coolant circuit of said engine; it is typically water with antifreeze added.

Figure 1:
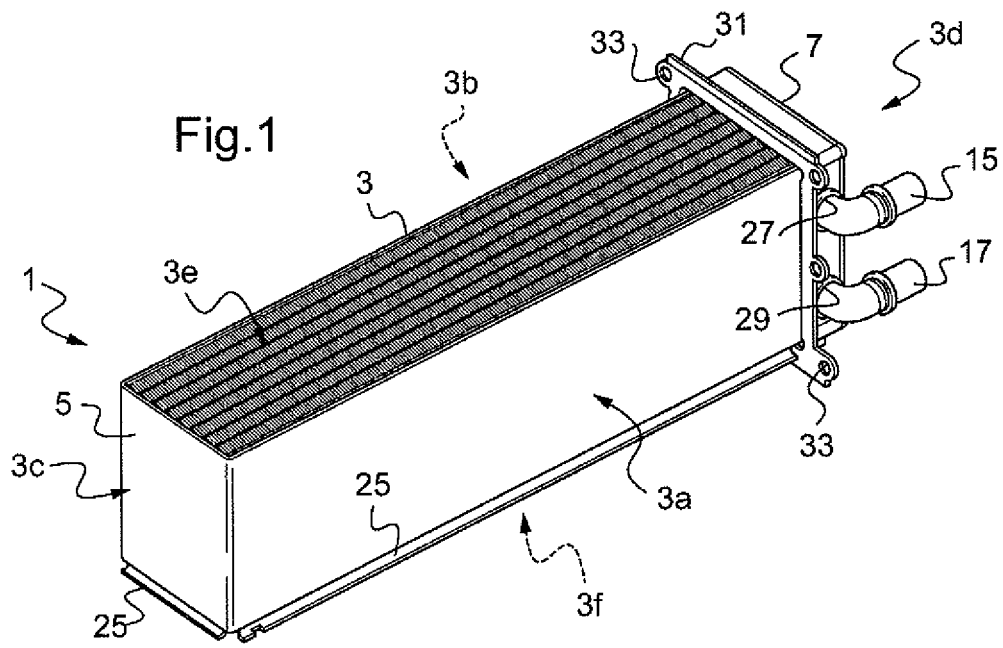
FIG. 1 is a perspective view of a heat exchanger.

FIG. 1 shows such a heat exchanger designated by the general reference 1.

According to the embodiment, the exchanger 1 has a substantially generally parallelepipedal form.

This exchanger 1 comprises:
- a heat exchange bundle 3 between a first fluid such as the supercharging air and a second fluid such as the coolant,
- a housing 5 for receiving the exchange bundle 3, and
- a cover 7 for closing the housing 5.

The Exchange Bundle

According to the embodiment illustrated, the heat exchange bundle 3 has a substantially generally parallelepipedal shape with two large lateral faces 3a,3b, two small lateral faces 3c,3d and two end faces 3e,3f.

Figure 3:
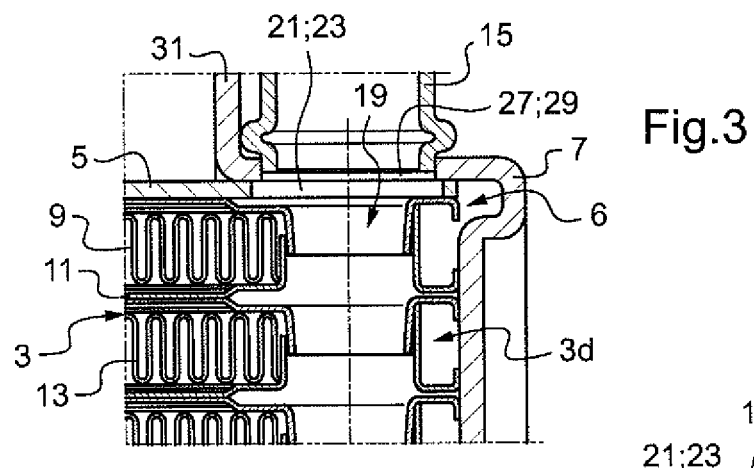
FIG. 3 is an enlarged partial view of a part of the cross-sectional view of the exchanger of FIG. 2.
Figure 2:
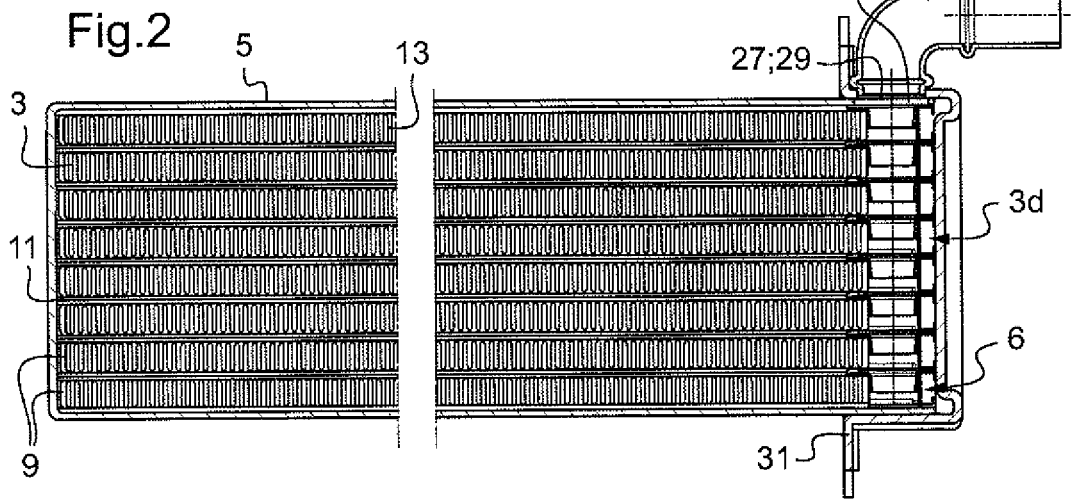
FIG. 2 is a cross-sectional view of the exchanger of FIG. 1.

This bundle 3 can conventionally comprise a stack of plates or of tubes, delimiting first canals 9 for the circulation of the first fluid and second canals 11 for the circulation of the second fluid (see FIGS. 2 and 3).

The first fluid passes, for example, through the first canals 9 in the longitudinal direction of the bundle 3 and the second fluid passes, for example, through the second canals 11 transversely from the first end face 3e to the opposite second end face 3f for example (see FIG. 1).

In the first canals 9, it is possible to provide disturbing fins 13, which can be better seen in FIGS. 2 and 3, so as to disturb the flow of the air in these first canals 9 by increasing the exchange surface area. As an alternative or in addition, it is possible to provide turbulators (not represented) for the second fluid circulating in the second canals 11, so as to improve the heat exchange.

These disturbances make it possible to facilitate the heat exchanges between the air and the water through the walls of the plates or of the tubes.

Furthermore, as can be seen in FIG. 1, the exchanger 1 comprises inlet 15 and outlet 17 pipes, for the intake of the second fluid into the bundle 3 and the outlet of the second fluid after having circulated in the second canals.

To this end, the plates or the tubes of the bundle 3 defining the second canals 11 have openings 19 (see FIG. 3) which communicate with the corresponding openings 19 of the adjacent plates or tubes and with the inlet 15 and outlet 17 pipes of the second fluid to allow for the circulation of the second fluid in the second canals.

Housing

As stated previously, the housing 5 receives the exchange bundle 3.

The housing 5 has a form that is open, in the example illustrated, on a small lateral face 3d of the bundle 3. The housing 5 therefore comprises a lateral opening 6 (FIGS. 2 and 3) on the small lateral face 3d of the bundle 3.

According to the embodiment illustrated, the bundle 3 being parallelepipedal, the housing 5 has a complementary substantially "U" shape. This "U" shape makes it possible to cover the large lateral faces 3a,3b and one small lateral face 3c of the bundle 3. The end faces 3e,3f of the bundle 3 are not covered by the housing 5 to allow the circulation of the first fluid, such as the supercharging air.

Moreover, in order to allow for the intake of the second fluid into the second canals 11, the housing 5 has inlet 21 and outlet 23 orifices (see FIGS. 2 and 3) communicating respectively with the inlet 15 and outlet 17 pipes. These orifices 21,23 also communicate with the openings 19 of the plates or tubes of the bundle 3.

Furthermore, referring once again to FIG. 1, the housing 5 can also comprise one or more raised edges 25. These raised edges 25 therefore protrude relative to the general plane defined by the faces of the housing 5.

When the exchanger 1 is received in a container such as a supercharging air intake manifold (not illustrated), assembling can be performed by inserting the exchanger 1 into the manifold via an associated opening of the manifold, for example in the longitudinal direction of the exchanger 3, and, in this case, the raised edges 25 can serve as mechanical guiding means for the assembling. A complementary guiding means can be provided on the manifold such as, for example, guiding grooves.

Obviously, other complementary guiding means can be provided, borne on the one hand by the housing 5 of the bundle 3 and on the other hand by the manifold (not illustrated).

Furthermore, the intake device can comprise one or more sealing means between the exchanger 1 and the intake manifold (not represented).

Closing Cover

As detailed previously, the exchanger 1 also comprises a cover 7. This cover 7 is, for example, made of a metal material.

The housing 5 has a laterally open form which is closed by the cover 7. The cover 7 is therefore assembled facing a lateral face 3d of the bundle 3 by closing the opening 6 of the housing 5.

The cover 7 thus participates in the mechanical strength of the bundle 3 of plates or of tubes and of any disturbers or turbulators.

Furthermore, in the case of an intake device with an exchanger 1 received in a manifold (not represented), the cover 7 also makes it possible to close the opening of the manifold provided for the insertion of the exchanger 1 into the manifold.

The cover 7 thus ensures the securing of the exchanger 1 in the air intake manifold (not represented) or in any other container of the exchanger 1.

The cover 7 is securely attached to the bundle 3 and to the housing 5.

An inseparable unitary assembly is thus produced. In this way, it is not necessary to provide, during assembling with the intake manifold, any additional step of assembling the cover 7 to close the bundle 3 and the manifold (not represented).

The assembly costs are thus reduced, and there is also no point in providing additional fastening elements such as screws or a snap-fitting system between the bundle 3 and the cover 7.

This cover 7 is securely attached in a seal-tight manner to the bundle 3 and to the housing 5. As an example, this secure attachment is done by brazing.

The sealing of the exchanger 1 is thus enhanced.

Furthermore, in the case of the insertion of the exchanger 1 into an air intake manifold, for example, or into any other enclosure or container, there is now only the sealing between the cover 7 and the manifold to be controlled; the sealing between the cover 7 and the bundle 3 already being assured.

Furthermore, in order to close the opening 6 of the housing 5, the cover 7 therefore has a shape complementing that of the housing 5.

According to the embodiment illustrated with a substantially "U" shaped housing 5, the cover 7 has a complementary substantially generally "U" shape.

Moreover, as can be better seen in FIGS. 2 and 3, the cover 7 caps the small lateral face 3*d* of the bundle 3 as well as the ends of the housing 5. In this way, the housing 5 is inserted between the bundle 3 and the cover 7.

The inlet 15 and outlet 17 pipes are therefore fixed in a seal-tight manner, for example by brazing, to the cover 7. It is therefore not necessary to provide additional sealing means, such as seals, at these pipes 15,17.

In order to allow for the distribution of the second fluid, the cover 7 therefore has, in line with the pipes 15,17, orifices 27,29 respectively associated with the pipes 15,17 and with a form complementing the form of the pipes 15,17.

These orifices 27,29 communicate with the associated orifices 21,23 provided on the housing 5, as well as with the corresponding openings 21 of the bundle 3 to allow for the circulation of the second fluid in the second canals 11.

The cover 7 thus ensures a seal-tight connection between the inlet 15 and outlet 17 pipes of the second fluid and the bundle 3.

Furthermore, the cover 7 may contain a folded-back peripheral edge 31, which can be better seen in FIG. 1.

This edge 31 is, for example, folded substantially to 90°.

This edge 31 forms, for example, a protrusion relative to the housing 5 and to the bundle 3.

In the case of an intake device, for example, comprising such an exchanger 1 received in a manifold, the sealing between the exchanger 1 and the manifold (not represented) can be done at this peripheral edge 31.

In practice, sealing means (not represented) can be provided on the peripheral edge 31. The cover 7 thus ensures the external sealing of the bundle 3.

Thus, with such a lateral cover 7 incorporated in the exchanger 1, the sealing between the bundle 3 and the cover 7 is already ensured, and it is the cover 7, in particular its peripheral edge, which supports the sealing means (not represented) with a container of the exchanger such as an air intake manifold.

The sealing between the exchanger 1 and the manifold is thus ensured. The cover 7 also participates in the sealing between the intake device and the outside environment.

Furthermore, the lateral closing cover 7 can also have means for fixing 33 for fixing to the air intake manifold (not represented) for example, which cooperate with complementary means for fixing (not represented) borne by the manifold.

This fixing can be done, for example, by brazing, bonding and/or by threading or even clipping.

The means for fixing 33 are, in the example illustrated, provided on the peripheral edge 31 of the cover 7 facing a lateral face of the manifold (not represented) delimiting an opening through which the exchanger 1 is inserted into the manifold.

The cover 7 thus ensures both the securing of the exchanger 1 in the manifold and the fixing of the exchanger 1 to the manifold.

It will therefore be understood that such a lateral cover 7 incorporated in the bundle 3 makes it possible to reduce the sealings of the bundle 3 with the outside environment which would have to be controlled, and makes it possible to define a seal-tight inseparable unitary assembly which is also less subject to vibrations in operation.

An exchanger 1 is thus obtained which improves not only the sealing but also the vibration phenomena.

The invention claimed is:

1. A heat exchanger between at least two fluids, for a motor vehicle, comprising:
   a heat exchange bundle between said fluids, and
   a housing for receiving said bundle, having at least one lateral opening,
   wherein said exchanger also comprises a cover for closing said at least one opening of said housing, wherein said cover is securely attached in a seal-tight manner to said bundle and to said housing so as to form an inseparable unitary assembly; and
   wherein said cover has a peripheral edge forming a protrusion relative to said bundle and to said housing and said protrusion protrudes from an outside surface of said inseparable unitary assembly, wherein said housing has a "U" shape and further includes three separated and raised edges disposed about a periphery of a bottom face of said housing, and wherein one of said at least three separated and raised edges has a first clipping tongue configured to cooperate with a second complementary clipping tongue.

2. The exchanger according to claim 1, wherein said cover has a "U" shape complementing the shape of said housing.

3. The exchanger according to claim 1, wherein said cover is securely attached by brazing.

4. The exchanger according to claim 1, wherein said peripheral edge comprises a fixing device configured to delimit an opening for fixing said exchanger.

5. The exchanger according to claim 1, wherein said peripheral edge of said cover is sealed to said housing such that said cover ensures external sealing of said bundle.

6. The exchanger according to claim 1, wherein said housing is inserted between said bundle and said cover.

7. The exchanger according to claim 1, comprising at least one fluid inlet pipe and one fluid outlet pipe, and wherein said cover has associated orifices for a passage of said fluid.

8. The exchanger according to claim 7, wherein said housing has other associated orifices for circulation of said fluid between said bundle and said pipes.

9. An air intake device, for a motor vehicle, comprising a heat exchanger according to claim 1.

10. The exchanger according to claim 2, wherein said cover is securely attached by brazing.

11. The exchanger according to claim 1, wherein said peripheral edge extends perpendicularly from said outside surface of said inseparable unitary assembly.

12. The exchanger according to claim 1, wherein said cover comprises two opposite U-shaped sections which are connected by a lateral wall.

13. The exchanger according to claim 1, said at least one raised edge protrudes relative to a plane defined by a face of said housing.

14. The exchanger according to claim 1, wherein said raised edge is disposed only on said bottom face of said "U" shaped housing.

15. The exchanger according to claim 1, wherein said peripheral edge forming a protrusion is a folded-back peripheral edge.

16. The exchanger according to claim 1, wherein said protrusion extends about an entirety of said cover.

* * * * *